United States Patent [19]

Ehrman et al.

[11] 3,807,018

[45] Apr. 30, 1974

[54] APPARATUS FOR SHEARING SPENT NUCLEAR FUEL BUNDLES

[75] Inventors: Chester S. Ehrman, Basking Ridge; Louis Scheib, Morristown, both of N.J.; Charles S. Worsley, Burlingame, Calif.; Frank J. Jones, San Bruno, Calif.; Robert M. Freeborg, Lafayette, Calif.

[73] Assignee: Allied Chemical Corporation, New York, N.Y.

[22] Filed: July 6, 1972

[21] Appl. No.: 269,348

Related U.S. Application Data

[62] Division of Ser. No. 98,249, Dec. 15, 1970.

[52] U.S. Cl. .............................. 29/200 D, 29/400
[51] Int. Cl. ............................................. B23p 19/00
[58] Field of Search ..... 29/200 D, 400 N, 427, 426, 29/200 B

[56] References Cited
UNITED STATES PATENTS
3,293,734   12/1966   Buckley ...................... 29/200 D

*Primary Examiner*—Thomas H. Eager
*Attorney, Agent, or Firm*—Jay P. Friedenson

[57] ABSTRACT

Apparatus for shearing long units, such as nuclear fuel bundles, into pieces of predetermined length for further processing comprising a sealable magazine for receiving the bundles, means for urging the bundle forward, a vertical and horizontal gag, or alternately two parallel-acting horizontal gags operated in conjunction with a vertical restraint, for compressing the front portion of the bundle, and a shear blade adjacent to the gags, whereby the nuclear fuel bundle may be urged forward in increments, compressed and sheared into pieces.

14 Claims, 12 Drawing Figures

APPARATUS FOR SHEARING SPENT NUCLEAR FUEL BUNDLES

This is a division, of application Ser. No. 98,249, filed Dec. 15, 1970, now U.S. Patent No. 3,763,770.

This invention relates to an improved material-cutting control system and more particularly to an apparatus for shearing nuclear fuel bundles into units of shorter and predetermined length. Apparatus to accomplish this operation is generally known as a fuel bundle shear. Such an apparatus serves to cut spent nuclear fuel bundles into short sections for feeding to a dissolution process wherein the pieces are leached with nitric acid to separate the acid-soluble uranium values from the insoluble hulls and end fittings.

Fuel bundles are commonly constructed of nuclear fuel-filled tubes up to about ⅝ inch in diameter which are banded together by tube sheets into square cross-sections which may vary up to about 12 inches square. These bundles may vary in length up to about 20 feet, and generally have end fittings to hold the assembly together and to serve as distributing heads for cooling water.

The emission of neutrons within a nuclear reactor brings about a degree of embrittlement in the material of construction of the bundle as well as in the fuel pellets with which the tubes are filled. This embrittlement introduces a problem in the nuclear fuel recovery process, for it can lead to premature breakage of the tubes when the bundle is being fed into the shear blade for shearing. This can result in undesirable variations in the length of the cut pieces. It is the aim of the present invention to obtain an accurate length of cut. The nuclear fuel must be leached free of the acid insoluble hulls, and the time required to obtain complete solution varies with the length of the pieces. Inaccurately cut lengths of tube therefore make process control difficult and may lead to incomplete removal of the fuel from the tube sections. The ability to control the length of the cut pieces is essential to the proper operation of the shear, and realization of the objects of this invention.

Shears have been designed in the past for shearing spent nuclear fuel bundles, but these shears are generally limited not only as to the cross-section of the bundles which they will accommodate, but to the length of the bundles that can be handled as well. In the past it has generally been necessary to remove the end fittings or other hardware by a cutting machine before transferring the fuel bundles to a shear. Although a pressure device is sometimes used to hold and compress the tubes or rods during the shearing operation, the device employed can notch and distort the individual members, thus causing premature breakage of the embrittled tubes and undesirably leading to variations in the length of the cut pieces.

It is an object of the present invention to provide an apparatus for cutting fuel bundles of various sizes up to about 12 inches in cross-section and up to about 20 feet in length without prior disassembly of the apparatus.

It is a further object of this invention to provide an apparatus for shearing off the end fittings of the bundle as a part of the same operation in which the entire bundle is cut into lengths of the size chosen for the subsequent dissolution step.

It is a further object of this invention to provide means for compressing the bundles as each length approaches the point of shearing, to facilitate a clean shear without notching the embrittled fuel elements, which would contribute to premature breakage of these elements and consequently to variation in the length of the severed pieces.

It is a further object of this invention to provide for the lateral charge of the bundles into the shear, for the complete enclosure of the bundle in the apparatus and for the adjustment or insertion of a sidewall to thus align and guide the fuel bundle in its approach to the shearing member.

It is a further object of this invention to provide means for urging the bundle forward through the apparatus in predetermined increments, for acting upon the end of the bundle with a vertical gag and a horizontal gag, thus compressing the front portion of the bundle from two directions, or alternately compressing the bundle with two parallel-acting horizontal gags operating in conjunction with a vertical restraint, shearing off predetermined lengths of the bundle by means of a blade, and finally permitting the severed lengths to drop through a chute or conduit directly to the dissolution apparatus. (A "gag" as used herein is a clamping device which can also effect some collapse of the material held.)

It is a still further object of this invention to provide for unidirectional or two-directional gagging, wherein the gags are arranged in a removable module or assembly which may be readily removed and replaced by remote control. The restraining member may optionally be included in the removable module together with the gag(s).

These and other objects are accomplished according to our invention wherein the forward end fitting is cut from a nuclear fuel bundle, the entire fuel bundle is cut into short sections of predetermined length and the fitting end sections are delivered to the dissolution process together with the remaining end fitting.

Briefly, the apparatus comprises a chamber, open on one side to laterally receive the full length of the fuel bundle, means for closing and sealing the lateral opening of the chamber, a movable sidewall which may be adjusted according to the cross-section of the bundle contained in the chamber so as to serve as a guide for the fuel bundle, a feed member which urges the bundle forward through the apparatus in predetermined increments, a vertical gag with limited movement which first subjects the fuel bundle to a compressive force, and then, with its position fixed, serves as a restraint to the bundle while it is further acted upon by a horizontal gag, to cooperatively compress the front portion of the bundle from two directions. Alternately, two or more horizontal gags and a vertical restraining member are provided, which cooperate to diminish the width of the front portion of the bundle while essentially retaining its height. This arrangement can also provide another important service, for if the fuel bundle jams during the shearing operation, it may readily be freed by raising the movable restraining member. A moving shear blade is also provided, preferably having a stepped configuration, to shear the compressed portion of the bundle, and a conduit beneath the shearing member in communication with the dissolution apparatus through which pieces sheared from the fuel bundle may be conducted to the subsequent dissolution step. In each of the two embodiments both gags are preferably contained within a removable module and their contact faces are contoured to insure satisfactory compression of the bundle.

More specifically, those portions of the nuclear fuel bundle shear of our invention which are in direct communication with nuclear material, are contained in a hot cell, and the moving parts are controlled remotely, being actuated by means such as hydraulic and pneumatic cylinders, and electric motors. The chamber which accepts the spent nuclear fuel bundle comprises a magazine which may be opened laterally for loading, then closed and essentially sealed. The seal, which is not absolute, may be achieved, for example, by means of tight fitting lips or by metal gaskets consisting of multiple layers of resilient metal strips arranged squeegee fashion along either the moving edges, or the stationary edges to be sealed. When the loading entry of the magazine is closed, the only other major opening is that through which the bundle is urged when it is to be sheared by the shearing member.

A housing surrounds the shear blade, said housing being in communication with the conduit and also with the gag module and magazine, thereby forming a closed, essentially air-tight system with the dissolution apparatus.

Normally, the dissolution apparatus is maintained under slightly reduced pressure to control the flow of fine particles and gases generated by shearing the fuel bundle, and to prevent backflow of acid fumes from the dissolution apparatus up into the shear; hence, air from the surrounding hot cell leaking into the sealed magazine and at other points in the closed system, flows through the conduit to the dissolution apparatus.

The shearing member comprises a blade having a stepped, a pyramidal or an angular guillotine-like configuration. This slideably arranged shear blade positioned in cooperative relationship with a stationary shear block is also slideably positioned in sealing relationship with the opening of the magazine through which the fuel bundle extends. Accordingly, the extended blade serves substantially as a relatively gas-tight gate to the magazine, but permits gas flow through the opening when in a retracted position.

The sheared pieces and the end fittings of the fuel bundle drop through an open ended conduit and are directed thereby to the dissolution step of the recovery process. Each time the shear blade completes its stroke, it might be expected that it would interrupt the flow of air from the magazine and the surrounding hot cell. Interruption of the flow of air during the shearing operation would be undesirable; therefore, a valve-controlled by-pass is provided to prevent such an interruption.

During the loading operation, however, the shear blade is fully extended, thus acting as a gate valve for the opening between the magazine and the housing surrounding the aforesaid open ended conduit. At such times the by-pass is also closed to a point where the flow of air is limited to essentially that which would normally be obtained from leakage into the closed magazine, thereby permitting the loading operation without affecting the partial pressure maintained in the dissolution apparatus.

There are many ways in which this air flow can be controlled; for example, a butterfly valve can be employed, the periphery of the movable disc of which has an adjustable notch or perforation, or is otherwise prevented from entirely closing, so that in its position of minimal flow the opening remaining admits essentially the same flow of air normally obtained as a result of leakage into the closed magazine.

In operation, such a valve is opened when the magazine is closed and cut off from the balance of the system by the fully extended shear blade. It is closed when the magazine is closed, but not cut off from the system by the shear blade in its retracted position. Most importantly, it is also closed when the shear blade is fully extended and the magazine is open for the charging of a bundle, or for any other reason. In other words, the valve is controlled so that the flow of air through the conduit to the dissolution apparatus remains essentially constant under all circumstances. Operation of the valve may be based on pressure differentials, or it may be operated by mechanical or electrical means.

In the drawings, we have illustrated two embodiments of the invention.

Figure 1:
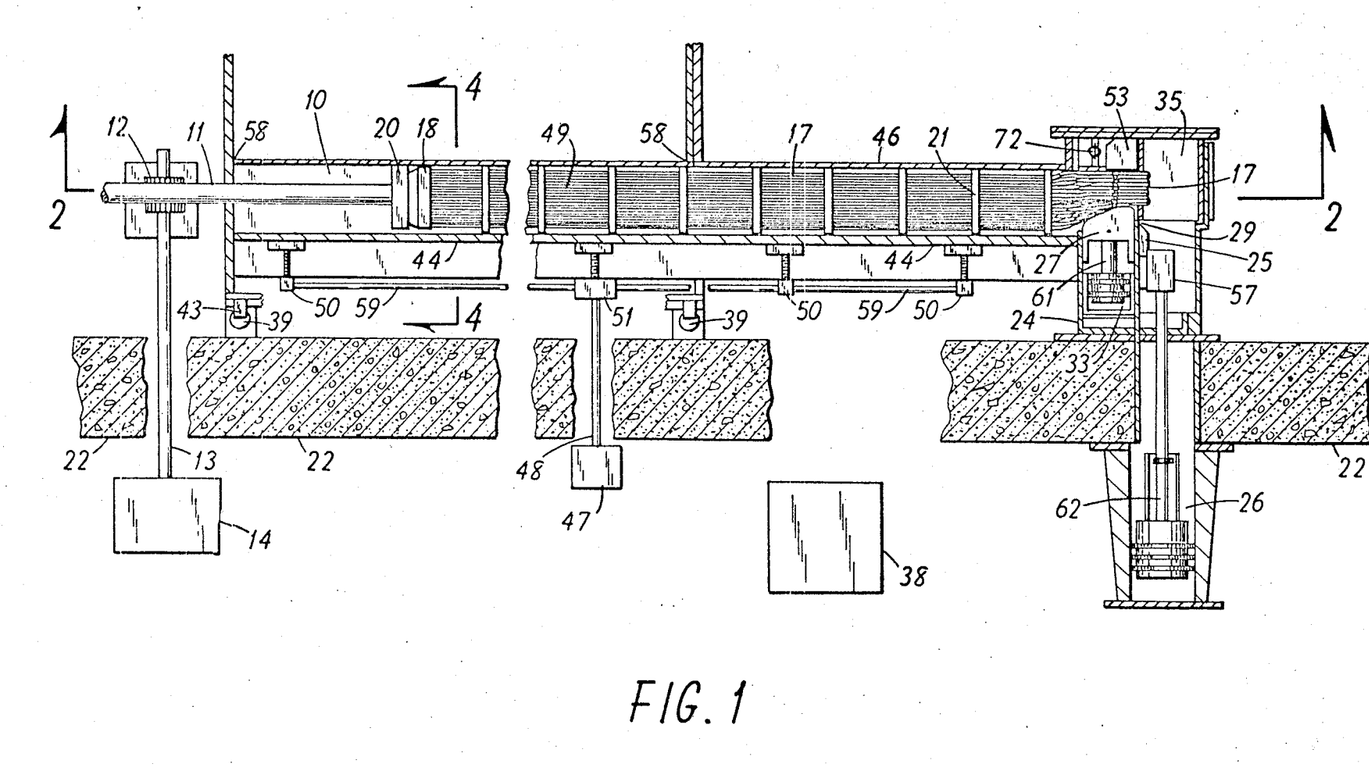
FIG. 1 is a plan view of the preferred embodiment, being partially in horizontal section with covers removed. Minor details have been omitted.

Describing in illustration but not in limitation, and referring to the drawings, FIGS. 1, 2, 3, 8, 9, 11 and 12 shows a partially sheared nuclear fuel bundle positioned in the apparatus. In FIG. 1 a typical nuclear fuel bundle as it comes from the reactor is shown as 17 having fuel end cap 18 and fuel spacers 21. In the illustration the first end cap has been removed by shear blade 25.

In operation, a typical fuel bundle which may vary in cross-section up to about 12 inches or in length up to about 20 feet, is first delivered to the magazine in a horizontal position.

Figure 4:
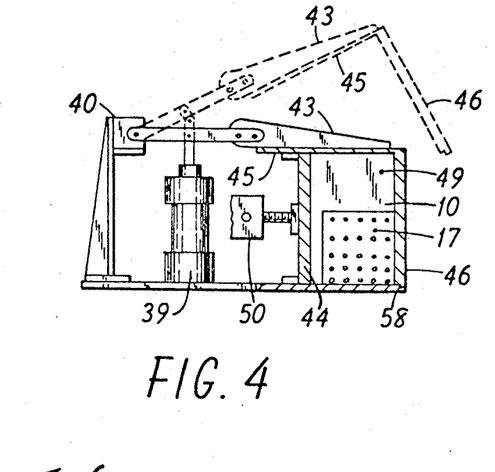
FIG. 4 is a transverse section on the line 4—4 of FIG. 1.

In preparation for receiving the fuel bundle within the magazine, movable plate 44 of FIGS. 1 and 4 is moved toward side section 46 until the distance between these parallel surfaces is just sufficient to accommodate the particular fuel bundle to be charged, and to insure its alignment with respect to the shearing mechanism. Alternately, rather than a movable wall, appropriately sized or positioned inserts may be placed along the back wall of the magazine to thus leave just sufficient room for the selected bundle to be guided in slideable alignment with the shearing mechanism.

Figure 8:
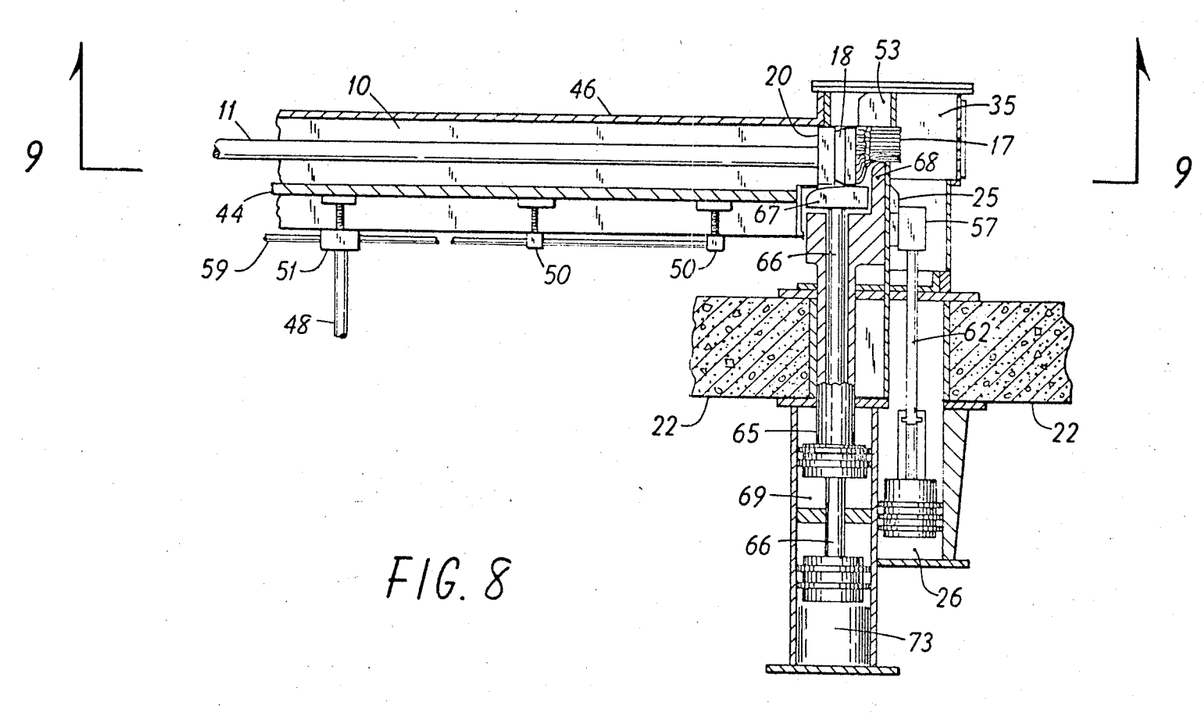
FIG. 8 is a plan view of the shearing end of the unit illustrating an alternate embodiment wherein two adjacent independently acting gag blocks operate in cooperation with and at essentially right angles to a restraining block, not shown.

In illustrations 1, 4 and 8, a movable side 44 is shown powered by driving means so that it may be moved in a piston-like manner towards or away from parallel end section 46 in order to adjust the width of the magazine to the size of the fuel bundle to be received. This movable side 44 is slideably arranged and sealed against the side walls of the magazine at all points along its periphery.

Although this movable sidewall 44 ordinarily is adjusted before the bundle is placed in the magazine, it may, if desired, be moved afterward, thus urging the bundle into proper alignment against parallel surface 46 of FIGS. 1 and 4. Although there are many different ways in which movable plate 44 may be moved into position, the method here illustrated comprises a gear train powered by motor means 47 of FIG. 1 which operates outside of concrete barrier 22 enclosing the hot cell. Torque is applied selectively in either direction to rotatable shaft 48 which extends through concrete barrier 22, operates through gear box 51, FIG. 1, horizontal rotatable shafting 59 parallel to the magazine, and miter gears 50 at a plurality of points adjacent to wall 44. At each of these points, the center of the driven miter gear is threaded to cooperate with an axially extending screw or worm, one end of which is attached to movable plate 44, whereby the simultaneous unidirectional turning of all the driven miter gears will urge the screws or worms, and wall 44 attached thereto, toward or away from, end section 46 depending on the direction of rotation imparted to the driven miter gears by motor means 47. Wall 44 may also be a stationary member, pre-positioned for a specific size of fuel bundle, and having no mechanism for lateral motion.

When magazine 10 has been adjusted as described, to receive the fuel bundle, the bundle is pushed laterally into the magazine through the open throat section 49, FIGS. 1 and 4. This magazine is normally closed and sealed by top section 45 of FIGS. 2 and 4, and side section 46 of FIG. 4. These sections may be raised and subsequently closed as a unit by bracket 43. Appropriate linkages and motor means are shown as support 40, and one or more air actuated pistons and cylinders 39. When the bundle has been horizontally positioned in the magazine it is covered and sealed through the action of air actuated cylinders 39 which may be remotely operated. When the magazine is in closed position, appropriate sealing is provided at contact edges 58 of FIGS. 1 and 4.

Figure 2:
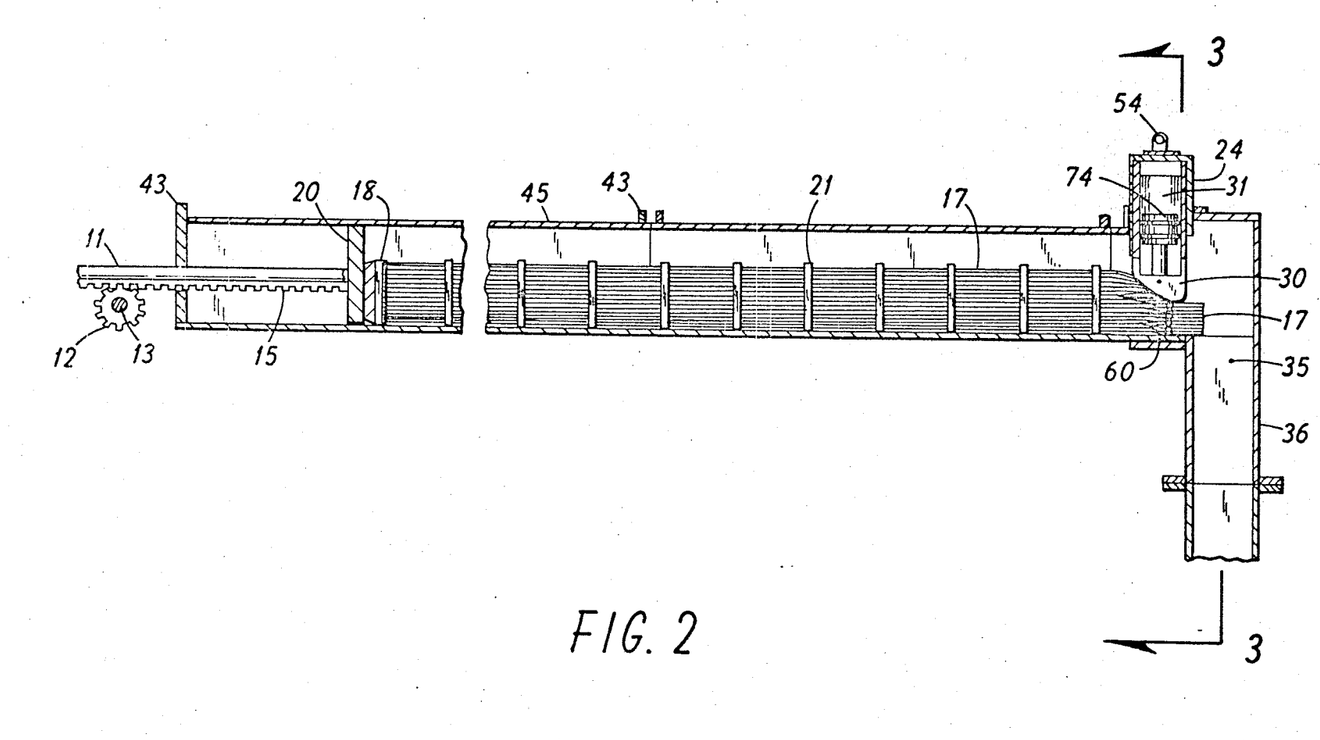
FIG. 2 is a vertical section on the line 2—2 of FIG. 1.
Figure 3:
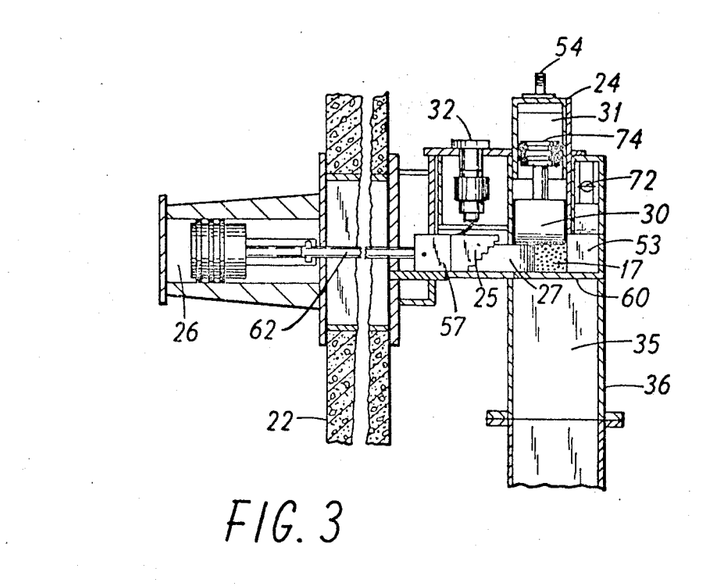
FIG. 3 is a transverse section on the line 3—3 of FIG. 2.

In operation, nuclear fuel bundle 17 is urged by pusher head 20 through the gag module 24 (when gags 27 and 30 have been moved away from the bundle), past moving shear blade 25, and over the conduit opening 35, FIGS. 1, 2, and 3. The distance beyond the shear blade to which the bundle is urged is determined by the size of the fuel end cap or fitting 18 to be removed by, the first cut, and thereafter by the length of the pieces required for the subsequent dissolution step. The movement of pusher head 20 and, therefore, of the fuel bundle 17, is accomplished and controlled by shear feed push rod 11, FIGS. 1, 2, 8 and 9, shown partially advanced. The motor means for achieving this motion is shown as drive mechanism 14 which operates outside of concrete barrier 22 and supplies motive power through the concrete wall by means of rotating shaft 13 affixed to pinion 12 which engages rack 15 on shear feed push rod 11, FIGS. 1 and 2. Depending on the direction of rotation of shaft 13, push rod 11 may be moved in one direction away from the shearing head to thus permit the lateral positioning of a new fuel bundle in the empty magazine; or it may urge fuel bundle 17 forward for action by the shear. The moving shear blade 25 and gags 27 and 30 are retracted, and the fuel bundle is advanced to a point where it extends beyond the shear blade 25 by a predetermined amount. Gags 27 and 30 are then urged by means of hydraulic pressure against the fuel bundle, which is supported against a fixed backing, whereby the fuel bundle is greatly compacted at the point adjacent to the shear blade, and the cross-section consequently is considerably reduced. More specifically, in the embodiment illustrated in FIGS. 2, 3 and 5, gag block 30 is slideably arranged to move vertically and in a direction perpendicular to the positioned bundle. This motion is imparted as a result of the gag block being attached to the piston and piston rod assembly 74 of hydraulically activated cylinder 31. When gag block 30 moves toward the nuclear fuel bundle, it compresses the bundle against stationary plate 60 beneath. This gag, however, is preferably somewhat wider than the fuel bundle, and assuming it does not strike a non-compressible end fitting or fuel spacer, it reaches the end of its downward stroke at a predetermined fixed point, positioned to permit reduction of the vertical dimension of the bundle to about 80 percent of its original value, FIGS. 3 and 5.

Horizontal gag 27 has a vertical dimension equal to about 80 percent of the vertical dimension of the fuel bundle to be acted upon; accordingly, when the vertical gag block 30 reaches the lower end of its stroke, it is essentially in contact with the narrower horizontal gag 27. When the gags are activated, therefore, the vertical gag 30 which is sufficiently wide to overhang the horizontal gag 27, even when the latter is fully retracted, compresses the end of the fuel bundle downwardly until said vertical gag contacts or essentially contacts the horizontal gag. At this point it therefore remains fixed and restrains the bundle as the horizontal gag 27 slides beneath to further compress the end of the bundle against shear anvil 53, FIG. 3.

With this novel arrangement the section of the fuel bundle adjacent to the shear blade may be compressed at will in two directions at right angles to each other and the hydraulically actuated gags may be controlled and operated remotely.

Since the tubes which comprise the fuel bundle are frequently rather brittle, there would be considerable breakage of these elements if the face of the gag which contacts the fuel bundle were parallel to the bundle before compression. In such a case, considerable distortion and notching of the tubes would occur at the edge of the gag away from the shearing mechanism. It has been found, however, that if the contour of the face of the gag block which contacts the tubes is so shaped that the strain is distributed in an essentially even and uniform manner throughout the section beneath the gag, and for some distance beyond in both directions, then the breakage of embrittled elements will be minimized. Such a contour is obtained when the contact face of the gag is made to slope gently toward the bundle to be compressed, with the lowest edge adjacent to the shear. Further, the edge of the gag block towards the shear and the edge away from the shear should be rounded.

Figure 7:
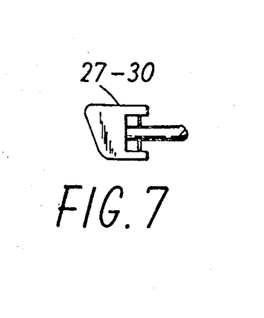
FIG. 7 is a cross-sectional view of gags 27 and 30 illustrating the approximate contour of the holding member or gag block.

Such a contour is approximated in FIG. 7. With such a contour the curve traced by those tubes in contact with the gag, back to the point where no compression has taken place, depicts a uniformly gentle curve or slope. A second horizontal gag may be used to further distribute the strain on the tubes when they are subjected to compression by the gags.

In another variation not shown, gags with variable sloping contact faces may be employed, as for example by controlling the edge of the contacting face nearest the shear blade, by hydraulic means, while the edge most distant from the shear blade is hinged to a fixed point such as a point on the inner wall of the magazine. A contact face hinged to and spanning the distance between the ends of two parallel, hydraulically activated piston rods, may be used to similarly present a variable slope which can be controlled to distribute the pressure applied to the tubes of a fuel bundle when such a contact surface is employed in gagging.

Figure 5:
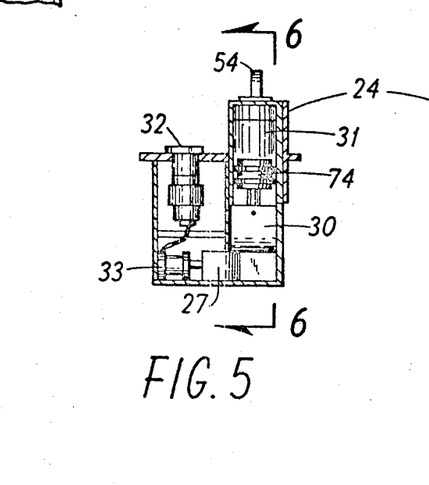
FIG. 5 is a vertical section showing detail of the removable gag module 24 of FIGS. 2 and 3.

If one or both of the hydraulic cylinders which actuate the gags must be limited in size because of space considerations, the effectiveness of the smaller cylinder or cylinders can be enhanced by the use of a booster cylinder as illustrated in FIG. 5. Whereas cylinder 33 activating horizontal gag 27 is shown as considerably smaller than cylinder 31 which activates vertical gag 30, the use of booster cylinder 32, FIGS. 3 and 5, increases the effective force exerted by cylinder 33 which can then apply force comparable to that provided by cylinder 31.

It will be noted in examining FIG. 5 that the dimension of the two gags working at right angles to one another limits the area of the cross-section to which the bundle can be compressed.

It is further noted that travel of vertical gag 30 is limited by interference with horizontal gag 27. The vertical gag 30 is advanced downward to compress the bundle vertically, then the horizontal gag 27 compresses the bundle horizontally. The total movement of the outer rows of tubes is thus limited, to reduce potential breakage due to gagging. This is the essence of the two gag system.

Since the compressed cross-section of a small bundle must be considerably less than that of a large bundle, different size gags will be used for fuel bundles within a specified size range.

Figure 6:
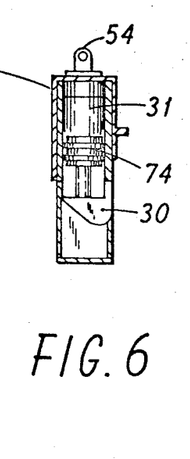
FIG. 6 is a vertical section showing detail of the removable gag module 24 on line 6—6 of FIG. 5.

To minimize shutdown time, in the preferred embodiment of the present invention, both gags and their actuating cylinders are contained in a removable module as detailed in FIGS. 5 and 6. This module has a lifting ring 54 and therefore can be removed from the nuclear shear, and replaced by another, having gags which are either smaller or larger as the case may require, by remote control.

When the end of the bundle is compressed and held by gags 27 and 30 as previously explained, shear blade 25 attached to shear block 57, FIGS. 1, 3, 8, 11 and 12 is urged forward by remotely controlled hydraulic cylinder 26 which lies outside concrete barrier 22 and transmits its power through the barrier by means of piston rod 62. This action simultaneously shears off the extended section of the compressed fuel bundle and cuts communication between the magazine and the dissolution apparatus not shown.

To insure that the flow of air between the magazine and dissolution apparatus is not interrupted by the shear blade, by-pass valve 72, FIGS. 1 and 3, provides the necessary communication during the interval when the shear blade is fully extended, with the exception that it is always essentially closed when the magazine is opened for the insertion of a fuel bundle, or for any other reason. It is desirable, however, that the flow of air to the dissolution apparatus be essentially constant at all times during the operation, to prevent acid vapors reaching the shear from said dissolution apparatus, and to prevent an outflow of air from the fuel bundle shear or the hot cell into the atmosphere. For this reason the by-pass valve is designed so that at its position of minimal flow, it permits essentially the same air flow to the dissolution apparatus when the magazine is open for charging, as occurs as a result of leakage into the magazine when it is closed.

The cut pieces of the fuel bundle including the end fittings drop through conduit 35 to the dissolution apparatus. In those instances when the rear portion of the gags contact the relatively incompressible end fittings or tube spacers during the shearing operation, considerable compression of the multitube section still occurs because of the sloping contour of the gag faces.

Figure 9:
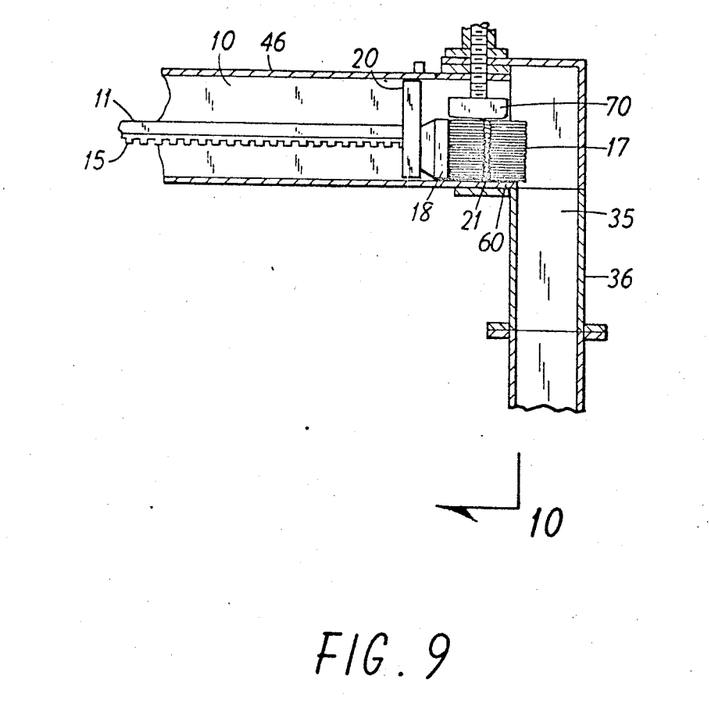
FIG. 9 is a half section elevation of the shearing end of the unit on line 9—9 of FIG. 8 showing the restraining member.
Figure 10:
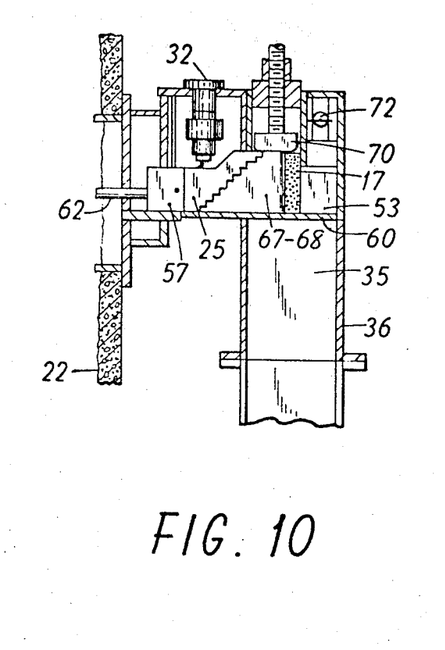
FIG. 10 is an end view on line 10—10 of FIG. 9, showing deformation of the end of the fuel bundle resulting from pressure applied by the horizontally acting adjacent gags in cooperation with a vertical restraining member.
Figure 11:
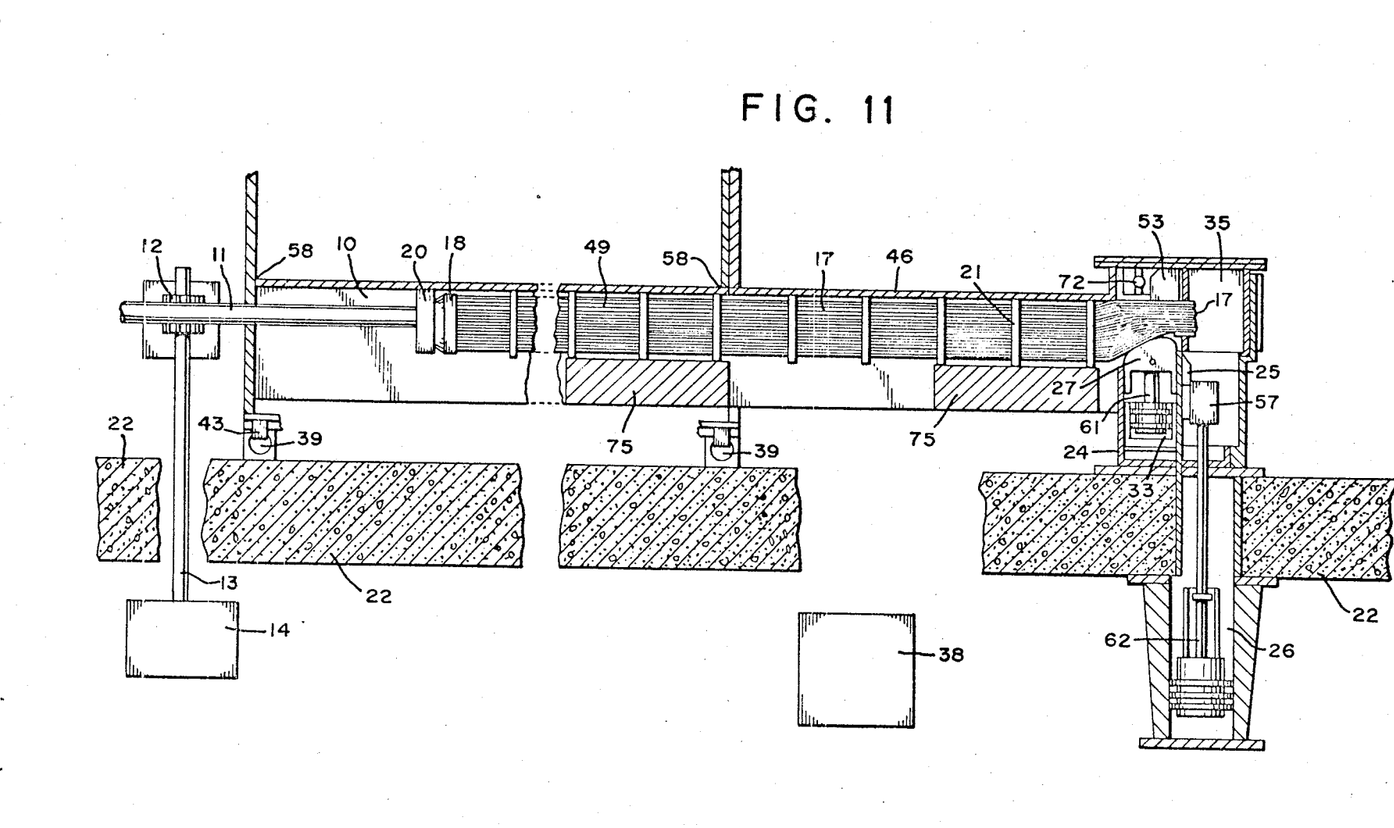
FIG. 11 is a plan view of an embodiment of the invention.
Figure 12:
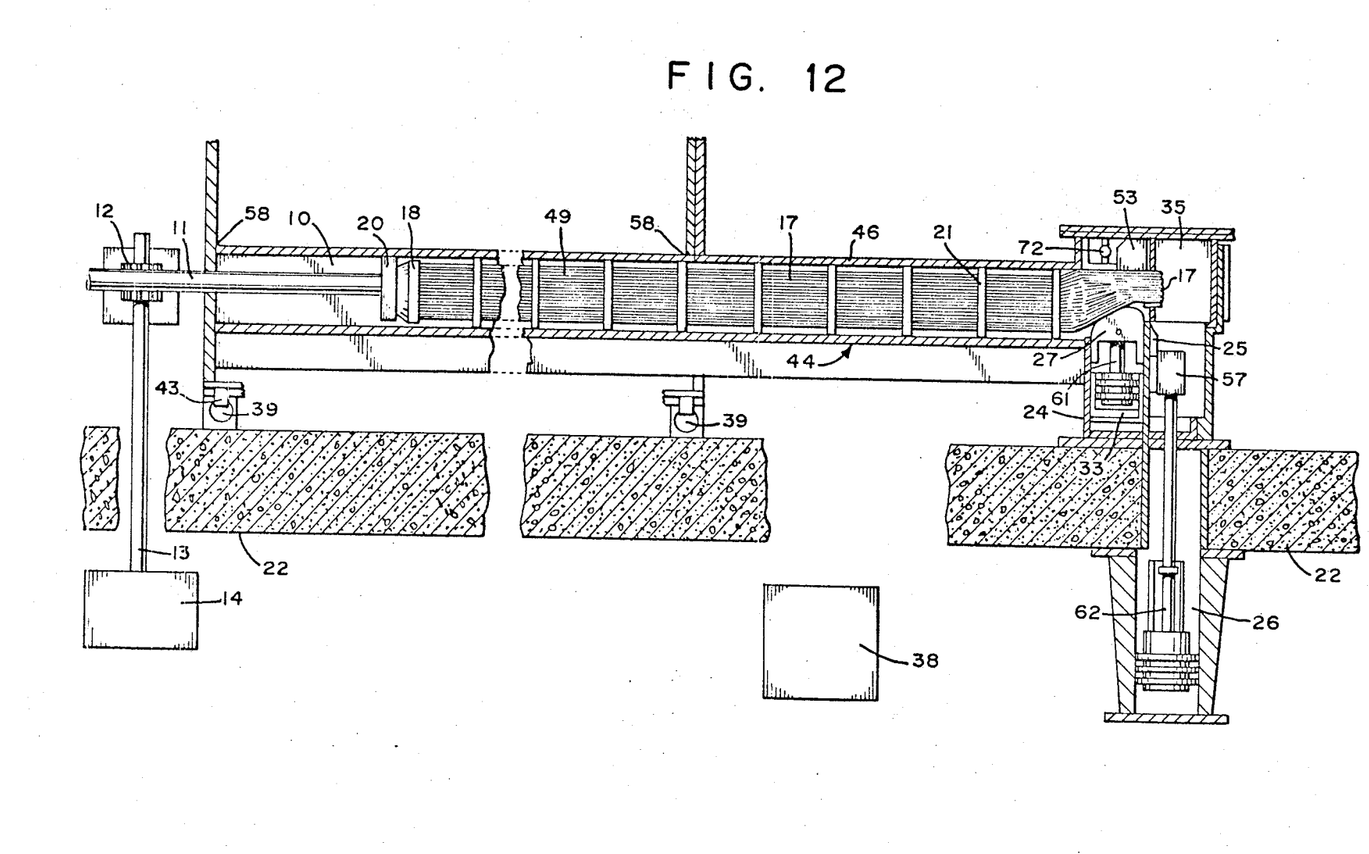
FIG. 12 is a plan view of an embodiment of the invention.

A variation in the arrangement of the gags is also illustrated in FIGS. 8, 9 and 10, which arrangement improves the degree of compression that is possible when a gag encounters an end fitting or tube spacer. Also, the cross-section of the compressed portion of the fuel bundle obtained by employing this embodiment is oblong, rather than essentially square. The advantage of this compression pattern lies in the fact that somewhat less sustained pressure is required in shearing through the bundle.

With this arrangement, there are two adjacent horizontal gags 67 and 68, FIG. 8. These adjacent gags may be independently actuated by parallel hydraulic cylinders contained within a removable module or by cylinders in tandem, as shown in FIG. 8. In this illustration, shaft 65 attached to gag 68 is shown as surrounding shaft 66 attached to gag 67, said shaft being slideably and concentrically positioned within. Both shafts extended, become the piston rods for piston-cylinder assemblies 69 and 73 respectively. In our illustration, both hydraulic cylinders, though in tandem, act independently, the piston in cylinder 69 being essentially a concentric ring about independently moving piston rod 66. This drawing is illustrative of just one of several ways in which such adjacent parallel acting gags may be actuated. These gags apply pressure on one side of the fuel bundle in the same direction as the adjacent shear, and compress the bundle against anvil 53. To prevent the upward mushrooming of the tubes, an adjustable vertical restraining member 70 is lowered until it is close to, or in contact with, the fuel bundle, before pressure is applied by the horizontal gags 67 and 68. This vertical restraint essentially maintains the vertical dimension of the fuel bundle while the gags considerably reduce its horizontal dimension usually to approximately 60 to 70 percent of its original value.

This arrangement is of particular benefit in shearing off the end fittings, for when the forward gag 68 holds the front fitting, independently acting gag 67 is free to compress the tubes adjacent to the fitting. Correspondingly, when rear gag 67 is holding the end fitting, gag 68 is free to compress the adjacent tubes. After the last shear, the end fitting is pushed into open conduit 35 by push rod 11, thereby following the sheared pieces into the dissolution apparatus.

Finally, 38 in FIG. 1 represents an operation-controlling console outside the concrete barrier, from which vantage point the entire operation is safely carried out. The fuel bundles are loaded into the magazine, aligned therein and the magazine closed and sealed. The bundle is urged through the shear in increments, the front end fitting sheared off, and the entire bundle is sheared into pieces suitable for dissolution. Both fittings and the sheared pieces drop through open conduit 35 to the dissolution apparatus where the acid soluble nuclear fuel is leached away from the insoluble tubes, fittings, and tube separators with a suitable acid solution. Different size bundles can be accommodated, and when necessary, various sized gags can be substituted as part of a compact portable module, all by remote control.

It can thus be seen that the nuclear fuel bundle shear apparatus of the present invention is manifestly capable of achieving the objects set forth in the specification, and while preferred embodiments of the present invention have been disclosed, it will readily be appreciated that the present invention is not limited thereto but may be otherwise embodied within the scope of the following claims.

We claim:

1. In an apparatus for shearing spent nuclear fuel bundles comprising a supporting structure, means for loading a fuel bundle onto the supporting structure, a shearing member at one end of the supporting structure, means for longitudinally urging the fuel bundle toward the shearing member, a conduit beneath the shearing member and a fuel bundle clamping means adjacent to the shearing member, the improvement in which the clamping means comprises one or more movable gags, slideably arranged to apply a compressive force to the fuel bundle in cooperation with a movable restraining member, positioned to restrain the bundle in a direction substantially perpendicular to the action of at least one of the gags, thereby reducing the cross-section of that portion of the fuel bundle adjacent to the point of shearing.

2. The apparatus of claim 1 wherein the means for loading a fuel bundle onto the supporting structure comprises a means for laterally loading the bundle.

3. The apparatus of claim 2 wherein the restraining member also serves as a gag, having limited movement to partially compress the fuel bundle and then remain fixed, whereby it serves as a restraint in cooperation with the gag(s).

4. The apparatus of claim 3 wherein each gag and the restraining member is characterized by a generally diagonal contact face, sloping in the direction of the shearing member.

5. The apparatus of claim 2 wherein the contact face of each gag and restraining member is modified by rounding the edge which is transverse with respect to the fuel bundle and away from the shearing member.

6. The apparatus of claim 2 wherein two movable gags adjacent to each other are positioned to apply parallel and independent compressive forces against one face of the bundle to be sheared, perpendicular to the movable restraining member.

7. The apparatus of claim 6 wherein each gag is characterized by a generally diagonal contact face.

8. The apparatus of claim 6 wherein the lower surface of the restraining member is substantially parallel to the upper surface of the fuel bundle and adjustably positioned over that portion of the bundle to be acted upon by the gags, whereby the height of the bundle is essentially maintained while the width is diminished by the compressive action of the gags.

9. The apparatus of claim 2 wherein the gag(s) are contained in a readily removable and replaceable module.

10. The apparatus of claim 2 wherein the gag(s) and the restraining member are contained in a readily removable and replaceable module.

11. The apparatus of claim 2 wherein the supporting structure which laterally receives the spent fuel bundles comprises a magazine having a closing member which forms essentially a sealed enclosure around the bundle to limit in-flow of air.

12. The apparatus of claim 11 wherein the supporting structure further includes a housing surrounding the shear blade, said housing being in essentially air-tight communication with the conduit and also with the magazine, thereby forming a closed system with the dissolution apparatus.

13. The apparatus of claim 12 wherein the shearing member comprises a slideably arranged shear blade which is positioned in cooperative relationship with a stationary shear block, said blade also being slideably positioned in sealing relationship with the opening of the magazine through which the fuel bundle extends, whereby the extended blade serves substantially as an air-tight gate to the magazine but permits air flow through the opening when in retracted position.

14. The apparatus of claim 13 which includes a bypass and valve between the magazine and the shear housing, whereby the flow of gas between the magazine and dissolution apparatus may be controlled when the flow is interrupted by the extension of the shear blade over the magazine opening.

* * * * *